G. W. GIBSON.
ANIMAL-TRAP.

No. 190,207. Patented May 1, 1877.

WITNESSES:
J. Wm. Garner
Albert J. de Peyk

INVENTOR:
G. W. Gibson
per
F. A. Lehmann,
Atty.

UNITED STATES PATENT OFFICE.

GEORGE WASHINGTON GIBSON, OF SHELBYVILLE, KENTUCKY.

IMPROVEMENT IN ANIMAL-TRAPS.

Specification forming part of Letters Patent No. 190,207, dated May 1, 1877; application filed March 17, 1877.

*To all whom it may concern:*

Be it known that I, GEORGE W. GIBSON, of Shelbyville, in the county of Shelby and State of Kentucky, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in the arrangement and combination of devices that will be more fully described hereinafter, whereby a cheap, simple, and effective trap is produced, in which each animal caught sets it for the next one that comes along.

Figure 1:
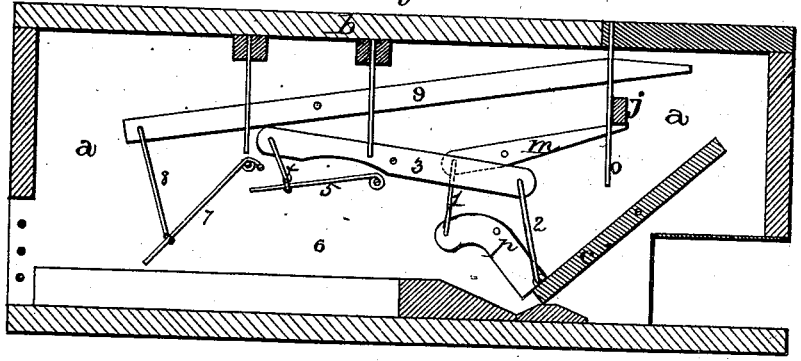
Figure 2:
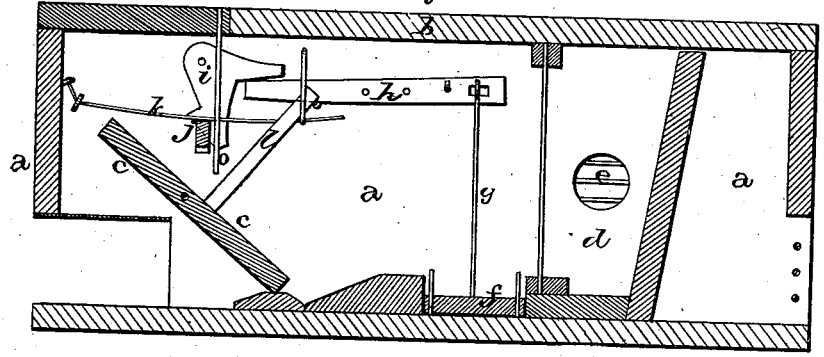
Figure 3:
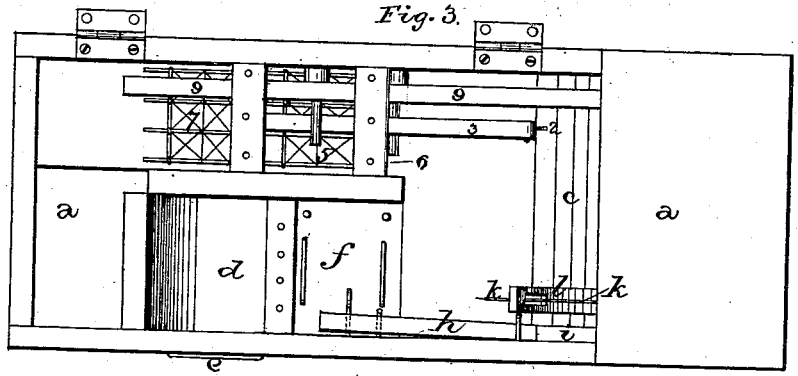
Figure 4:
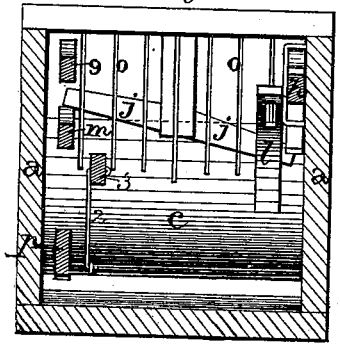

Figure 1 and 2 are vertical longitudinal sections of my trap. Fig. 3 is a plan view of the same, with the cover removed. Fig. 4 is a vertical cross-section.

$a$ represents the frame of the trap, of any suitable shape, size, or construction, and which has the hinged lid $b$, so as to give access to the mechanism of the trap, and the bait department. The lower corner and edge of the box is cut away at one end, so as to form an entrance for the animals, and the top of this entrance is covered with tin, so as to prevent animals from coming in contact with the front end of the door $c$, and closing it before entering the trap. The bait is placed in a small compartment, $d$, which has its front covered with wires, so as to allow the bait to be seen from the outside of the trap, and yet be protected from the animal after it is caught. Through the side of the box is made a small hole, $e$, leading into this compartment, so as to give light, that the bait may be more readily seen by the animal on entering the trap; but this hole is also covered over with wires to keep the animals while yet on the outside of the box from reaching the bait.

Just in front of the compartment $d$ is placed a vertically-moving platform, $f$, upon which the animal treads as it approaches the bait, and which sinks downward from the weight of the animal on guide-posts, into a recess in the bottom of the trap made for its reception, and through the connecting-rod $g$ draws the short end of the lever $h$ downward with it. The long end of the lever $h$ catches under the trigger $i$, and serves to pull the lower end of the trigger from under the lever $j$, when the spring K, which passes through a slot in the upper end of the post $l$ on top of the door, at once forces the door downward, so as to prevent the escape of the animal.

In order to prevent the animal from climbing on top of the door and interfering with the spring and lever over the door, instead of trying to make its escape through the rear end of the trap, the vertical wires $o$ project downward, and serve as a guard. The lever $j$ extends across the front end of the box, over the top of the door, and is held in position by a post extending downward from the top of the box, and one of its ends raises the spring $k$, while the other bears down upon the end of the lever $m$, which is connected by the rod 1 with the latch $p$. When the door falls the end of the pivoted latch $p$ catches over the edge of the closed door, and locks it in position, so that it can only be again opened by the animal attempting to get out through the rear end of the trap, or by opening the lid $b$.

Connected to the lower edge of the door by means of the rod 2 is the lever 3, which has its other end attached to the wire rod 4, which connects it with the gate 5, under which the animal must pass as it attempts to escape through the passage 6 to the rear end of the trap. This gate 5 is always open when the door is closed, and always closed when the door is open, in order to prevent the animal from making its escape should it turn back after starting under the gate 7, which is just in the rear of the gate 5 in the passage 6, and operates all of the resetting machinery of the trap. This gate 7 is connected by means of the rod 8, with the long pivoted lever 9, the front end of which bears down upon the top of the lever $j$, for the purpose of raising the opposite end of the lever $j$ high enough to catch on the trigger $i$. In thus forcing downward the end of the lever $j$, the front end of the lever $m$ is also forced downward, so as to unlock the door, and leave it free to rise. As the lever $j$ rises to catch on the trigger $i$, it raises the spring $k$ upward, and thereby releases the door from its pressure when it opens by its own weight, being pivoted in such a manner that the front end is the heavier. As the door rises, it lifts upward on the lever 3, and thereby closes the gate 5. As soon as the door falls, after the animal is caught, the gate 5 is opened, and the animal, seeing the light through the rear end, passes under the gate 7, thereby resetting the trap for the next animal that comes along.

The space in the passage 6 over the gates 5 and 7 is closed with vertical wires, which forms a part of the partition between the different departments of the trap.

The rear end of the trap is provided with longitudinal wire rods to admit light, and these are withdrawn in order to take out the animal caught.

Having thus described my invention, I claim—

1. The combination of the platform $f$, guide-posts, connecting-rod $g$, lever $h$, and trigger $i$, whereby the trap is sprung when constructed, and arranged substantially as shown.

2. The combination of the door $c$, spring $k$, lever $j$, trigger $i$, and post $l$, substantially as described.

3. The combination of the door $c$, levers $j$ $m$, rod 1, and latch $p$, substantially as set forth.

4. The combination of the door $c$, rod 2, lever 3, rod 4, and gate 5, substantially as specified.

5. The combination of the gate 7, rod 8, lever 9 $j$, trigger $i$, door $c$, and spring $k$, substantially as shown and described.

In testimony that I claim the foregoing I have hereunto set my hand this 8th day of March, 1875.

GEORGE WASHINGTON GIBSON.

Witnesses:
G. W. DEMARNE,
J. D. GUTHRIE.